US007024567B2

(12) United States Patent
Kim et al.

(10) Patent No.: US 7,024,567 B2
(45) Date of Patent: Apr. 4, 2006

(54) ELECTRIC POWER CONTROLLING METHOD THROUGH A SERIAL BUS

(75) Inventors: Yang Gi Kim, Seoul (KR); Hyeong Seog Kim, Osan-si (KR)

(73) Assignee: LG Electronics Inc., Seoul (KR)

( * ) Notice: Subject to any disclaimer, the term of this patent is extended or adjusted under 35 U.S.C. 154(b) by 597 days.

(21) Appl. No.: 10/128,331

(22) Filed: Apr. 24, 2002

(65) Prior Publication Data

US 2002/0162036 A1 Oct. 31, 2002

(30) Foreign Application Priority Data

Apr. 25, 2001 (KR) .............................. 2001-22451

(51) Int. Cl.
G06F 1/26 (2006.01)
G06F 1/28 (2006.01)
(52) U.S. Cl. ...................... 713/300; 713/330; 713/340
(58) Field of Classification Search ................ 713/300, 713/330, 340; 455/522
See application file for complete search history.

(56) References Cited

U.S. PATENT DOCUMENTS

| 5,532,945 A | * | 7/1996 | Robinson ..................... 713/321 |
| 5,842,027 A | * | 11/1998 | Oprescu et al. ............. 713/300 |
| 5,884,086 A | * | 3/1999 | Amoni et al. ................ 713/300 |
| 5,894,579 A | * | 4/1999 | Fujihara ..................... 713/324 |
| 5,964,879 A | * | 10/1999 | Dunstan et al. ............. 713/340 |
| 6,477,388 B1 | * | 11/2002 | Schmutz ..................... 455/522 |
| 6,526,516 B1 | * | 2/2003 | Ishikawa et al. ............ 713/340 |
| 6,594,771 B1 | * | 7/2003 | Koerber et al. ............. 713/330 |
| 6,618,811 B1 | * | 9/2003 | Berthaud et al. ........... 713/300 |
| 6,810,481 B1 | * | 10/2004 | Kawade et al. ............. 713/300 |
| 6,901,525 B1 | * | 5/2005 | Baker et al. ................ 713/340 |

OTHER PUBLICATIONS

Compaq, Hewlett-Packard, Intel, Lucent, Microsoft, NEC, Phillips, "Universal Serial Bus Specification", Rev. 2.0.*

* cited by examiner

Primary Examiner—Thomas Lee
Assistant Examiner—Ji H. Bae
(74) Attorney, Agent, or Firm—Fleshner & Kim, LLP

(57) ABSTRACT

A method of demanding/supplying a necessary electric power through a self-adjusting process between two devices connected by a Universal Serial Bus (USB), removing the requirement of disconnecting and re-connecting cable lines in order to make a power demand again. A power supplying device first determines how much electric power is demanded by a demanding device, then sends the device a signal of impossible supply or the like if the demand can not be met. The supplying device also determines whether or not a new electric power demand can be supplied if the demanding device demands again, and the supplying device then supplies power to the demanding device if the demand can be met. A power demanding device demands an electric power from a supplying device connected through the USB. The connected power demanding device first reduces the demand if a signal of impossible supply or the like is received from the supplying device, then demands the reduced amount from the supplying device.

11 Claims, 6 Drawing Sheets

Related Art

ELECTRIC POWER CONTROLLING METHOD THROUGH A SERIAL BUS

BACKGROUND OF THE INVENTION

1. Field of the Invention

The present invention relates to an electric power controlling method and apparatus, and more particularly, to a method of demanding/supplying a necessary electric power through self-adjusting operations between two devices coupled through a serial bus such as an Universal Serial Bus (USB).

2. Background of the Related Art

FIG. 1 shows a related art personal computer and several peripheral devices that are connected each other through an USB. In FIG. 1, the personal computer 100 acts like a host of the USB, and input devices such as an electronic pen 205, a mouse 204, etc. are connected to the host 100 through a hub 102 conducting a keyboard function and a hub 101 conducting monitor function. Audio input/output devices such as a speaker 203, a microphone 202, etc. are also connected to the host 100 through the hub 101 that conducts the monitor function, and various peripheral devices such as a telephone 201 and a hub repeater 200 are directly connected to the host 100.

The USB connecting a variety of devices each other has been standardized by mutual agreement among Intel, Microsoft, and other major companies to prevent possible communication failures, which might be caused by a variety of complicated connector interfaces. Therefore, most of personal computers currently support the USB standard.

The host 100 supporting the USB standard transforms an AC power to a DC power, which is fed to the hub repeater 200 as well as its own elements. The hub repeater 200 supplies the DC power from the host 100 to a detachable device 300, e.g., a Personal Digital Assistance (PDA), if connected through the USB. While the DC power is feeding, the detachable device 300 uses the DC power in charging its battery (not shown) or running the device.

Before supplying the detachable device 300 with a necessary electric power through the hub repeater 200, the host 100 communicates with the detachable device 300 through two signal lines of the USB to know how much electric power is demanded in the detachable device 300.

Thereafter, the host 100 measures how much electric power is being supplied to other connected peripheral devices, and determines whether it is possible for the host 100 to supply the electric power demand for the detachable device 300. If possible, the host 100 supplies the demanded electric power. If not possible, e.g., a remaining electric power is not enough to supply the electric power demand, the host 100 rejects the request of power supply in order to prevent interruption, instability of the electric power supply to other connected devices or the like.

However, if the electric power demand is rejected, the detachable device 300 resets a current connecting state immediately. Therefore, the detachable device 300 must be re-connected after being physically separated from the hub repeater 200 if the detachable device intends to make an electric power demand again.

When the detachable device 300 is re-connected to the host 100, the above-explained operations are conducted again. However, physical detaching and re-connecting work is time consuming and inefficient. Further, the physical detaching and re-connecting work is somewhat tedious because an USB port is usually equipped at the back of a device.

SUMMARY OF THE INVENTION

An object of the invention is to solve at least the above problems and/or disadvantages and to provide at least the advantages described hereinafter.

It is an object of the present invention to provide an electric power controlling method and apparatus that determines if an electric power is acceptable to a coupled peripheral device through negotiation with the peripheral device when an electric power is to be supplied from a host to the peripheral device.

Another object of the present invention is to provide an electric power controlling method, which is conducted through an USB, determining if an electric power is acceptable to a connected peripheral device through negotiation with the peripheral device when an electric power is to be supplied from a host to the peripheral device through the USB.

In order to achieve at least the above objects in whole or in part, and in accordance with the purpose of the present invention, as embodied and broadly described, there is provided a method of demanding and supplying electric power through a serial bus, including checking an electric power demand from a device when the device is connected through the serial bus, sending the device a power supply rejection signal if the demanded electric power is not supplied, determining whether a demanded second electric power can be supplied if received from the connected device, and supplying the demanded second electric power to the device based on the determining result.

To further achieve at least the above objects in whole or in part, and in accordance with the purpose of the present invention, as embodied and broadly described, there is provided a method of demanding and supplying electric power through a serial bus, including demanding electric power from a supplying device connected through the serial bus to a demanding device, reducing the demanded electric power if a power supply rejection signal is received from the supplying device, and requesting a reduced electric power from the supplying device be supplied to the demanding device.

To further achieve at least the above objects in whole or in part, and in accordance with the purpose of the present invention, as embodied and broadly described, there is provided a computer program embodied on a computer readable medium for a supplying device to monitor and control electric power supply, including the instructions of checking how much electric power is demanded from a device when the device is connected through the serial bus, sending the device a first signal of rejected power supply if the demanded electric power is not supplied, determining whether a newly demanded electric power can be supplied if demanded again from the device, and supplying the newly demanded electric power for the device based on the determining result.

To further achieve at least the above objects in whole or in part, and in accordance with the purpose of the present invention, as embodied and broadly described, there is provided a computer program embodied on a computer readable medium for a demanding device to monitor and control electric power supply, including the instructions of demanding electric power from a supplying device connected through the serial bus to a demanding device, reducing the demanded electric power if a first power supply signal is received from the supplying device, and requesting a reduced electric power from the supplying device again.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
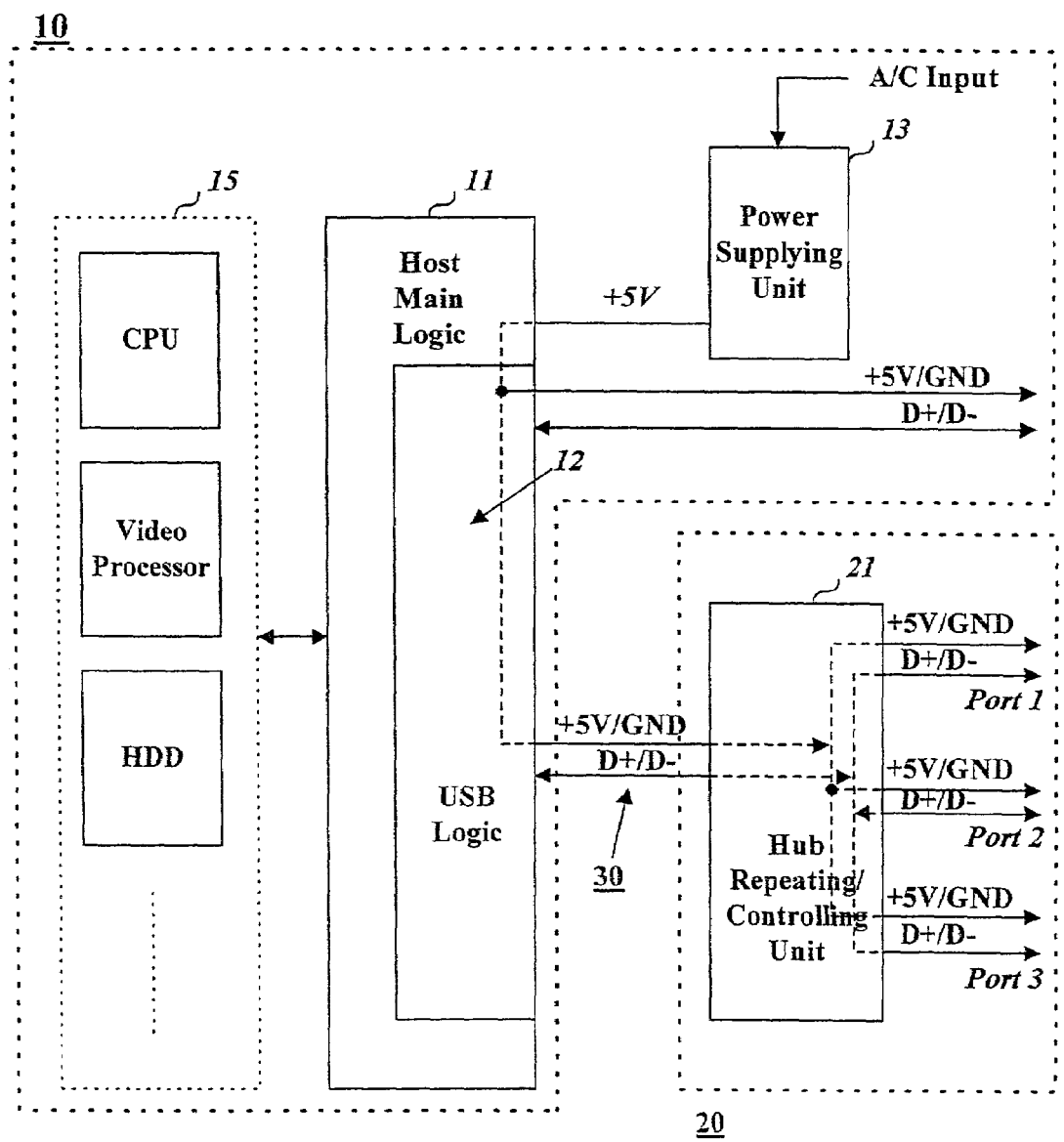
FIG. 2 shows a personal computer and a hub repeater, connected to each other through an USB, in which an electric power controlling method in accordance with the present invention is embedded.

In order to better understand the present invention, preferred embodiments will now be described with reference to the accompanying drawings. FIG. 2 shows a personal computer 10 and a hub repeater 20, coupled to each other through an USB, in which a preferred embodiment of an electric power controlling method in accordance with the present invention is embedded. The personal computer 10 of FIG. 2 preferably includes main components 15, including a CPU, a video processor, and a hard disk drive, a host main logic 11 interfacing with various devices according to USB standard and preferably controlling electric power supply, and a power supplying unit 13, which supplies a DC power, for example, a 5V power which is used in internal elements and is also supplied to external devices coupled through a USB 30, by transforming an AC power. The host main logic 11 includes an USB logic 12 capable of communicating data according to specification and protocol defined by the USB standard.

Figure 1:
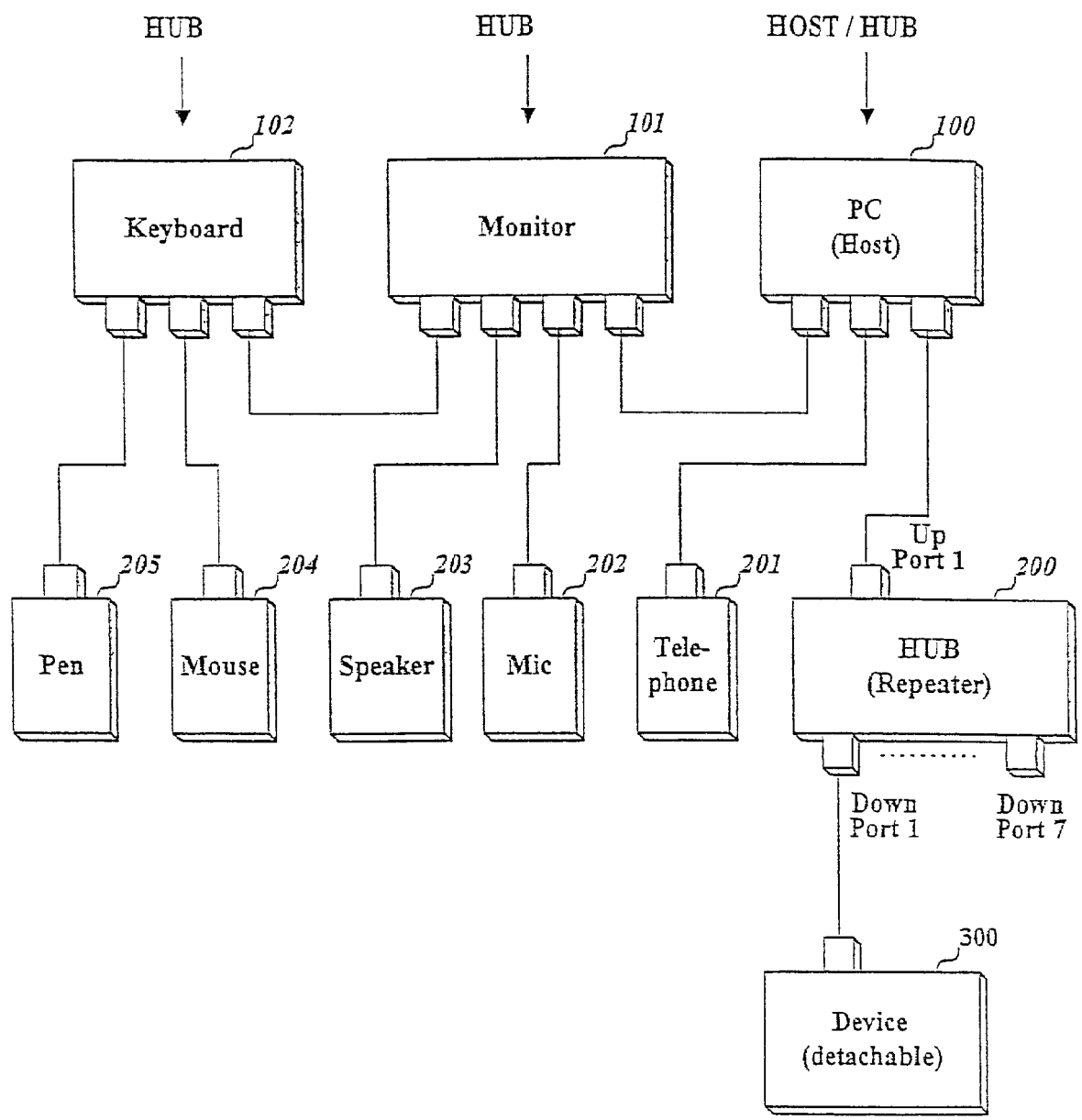
FIG. 1 shows a related art personal computer and several peripheral devices that are connected each other through an USB.

The hub repeater 20 of FIG. 2 includes a hub repeating/controlling unit 21 that amplifies or repeats signals to be communicated between the host main logic 11 and other additionally coupled devices. The hub repeater also conducts control functions, if needed. Signals communicated between the host main logic 11 and a peripheral device, for example, the detachable device 300 in FIG. 1, coupled via the hub repeater 20 or another device, for example, the telephone 201 in FIG. 1, coupled directly to the host main logic 11 are carried by two signal lines D+ and D− of the USB 30 through the USB logic 12.

All devices to be coupled via the hub repeater 20 or directly to the USB logic 12 are equipped with their respective connecting ports, each of which has two signal lines D+ and D−, a +5V power line and a ground line, for the purpose of supporting the physical connecting standard of the USB 30.

Figure 3:
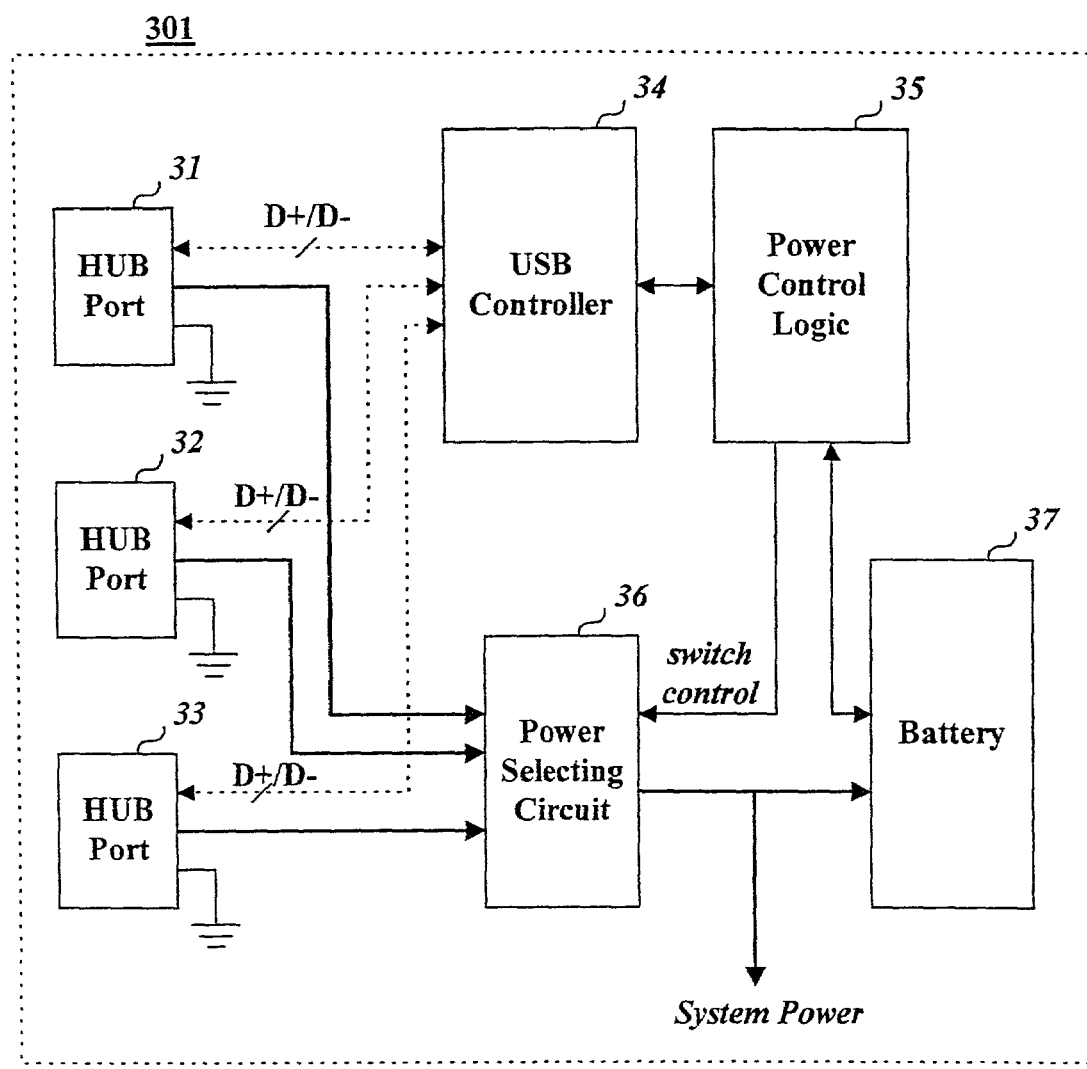
FIG. 3 is a partial block diagram of a detachable device, such as a notebook computer in which an electric power controlling method in accordance with the present invention is embedded.

A detachable device 301 such as a notebook computer or a Personal Digital Assistance (PDA) to be coupled via the hub repeater 20 or directly to the personal computer 10 includes, as shown in FIG. 3, several hub ports 31, 32, 33, satisfying the standard of USB and a rechargeable battery 37. A USB controller 34 is for communicating data with the host main logic 11 through one hub port coupled to the USB 30, and a power selecting circuit 36 preferably selects a DC power supply through the hub ports 31, 32, 33. A power control logic 35 is for controlling power selection of the power selecting circuit 36 and the charging operation of the rechargeable battery 37 in connection with the USB controller 34.

The host main logic 11 of the personal computer 10 and the power controlling logic 35 of the detachable device 301 can conduct a self-adjusting operation for power demanding/supplying directly or through the intermediary hub repeater 20. Such operations will now be described.

Figure 4:
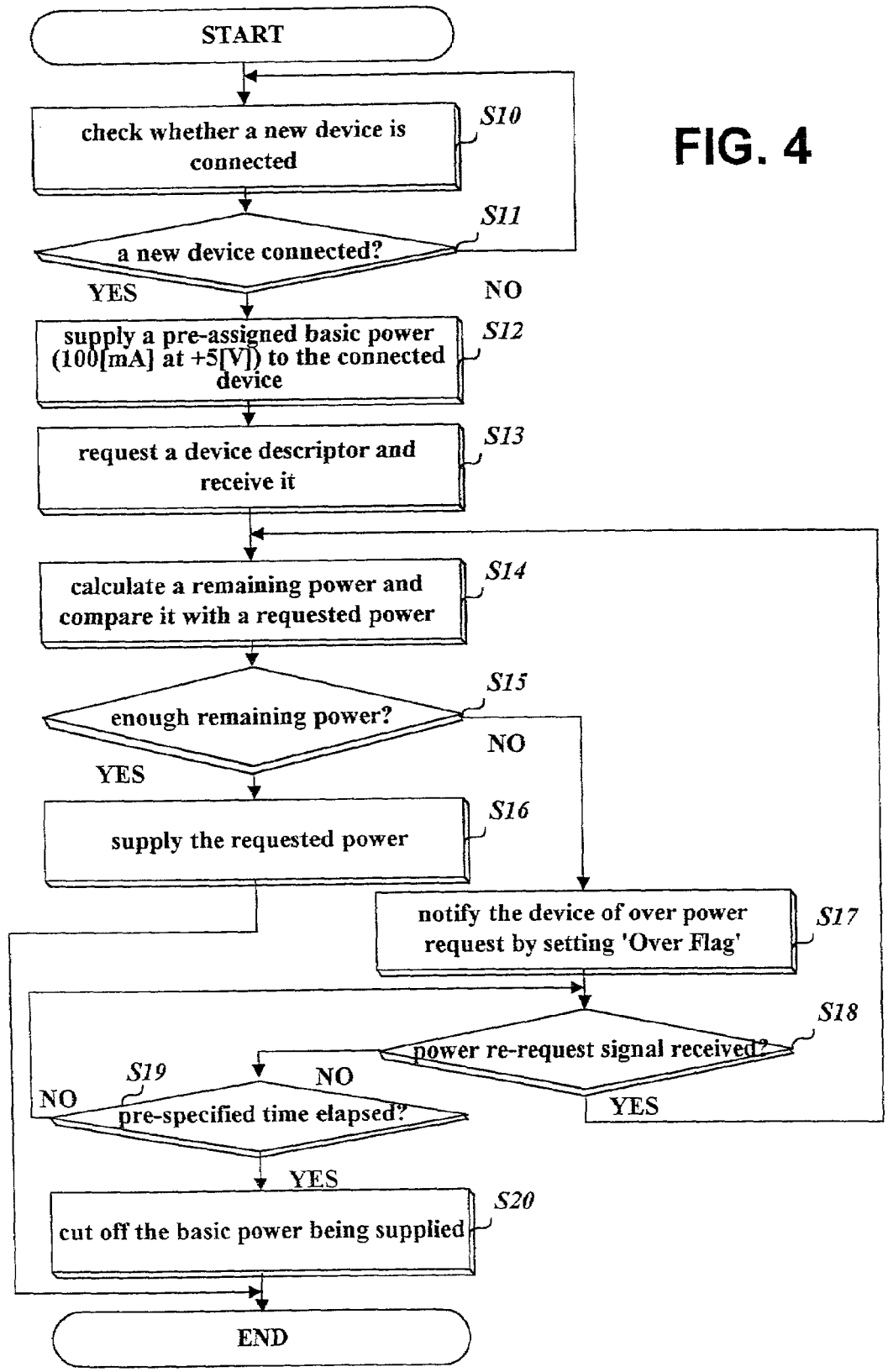
FIG. 4 is a flow chart of an embodiment of a power controlling method using an USB in accordance with the present invention.

FIG. 4 is a flow chart illustrating a preferred embodiment of a power controlling method conducted through an USB in accordance with the present invention. The preferred embodiment of FIG. 4 shows a self-adjusting or negotiating procedure conducted by the personal computer 10, which is a power supplying device.

After starting operations, the host main logic 11 of the personal computer 10 detects whether a new device is coupled directly to it or via the hub repeater 20 (Step S10). If a connection of a new device, e.g., a detachable device 301 such as a notebook computer or a PDA is made (Step S11), the host main logic 11 supplies a pre-assigned basic power supply, e.g., 100 mS at +5 voltage to the detachable device 301 directly or via the hub repeater 20 (Step S12). If no new connection to a device is detected (Step S11), then the check for a new device connection (Step S10) is repeated.

Thereafter, the host main logic 11 preferably requests a detailed information, i.e., a device descriptor of the device 301, and receives the device descriptor (Step S13) through the process of basic data communication. After analyzing the received device descriptor, the host main logic 11 knows how much electric power is required in the coupled device 301. At the same time, the host main logic 11 preferably measures how much electric power is being supplied to other devices coupled through the USB 30 and subtracts a maximum electric power that can be supplied by the host main logic 11 from the measured electric power to calculate a present remaining electric power that can be supplied to the connected device 301. After calculation of the present remaining electric power, the host main logic 11 compares it with a requested electric power (e.g., demanded amount) from the detachable device 301 (Step S14). If the present remaining electric power is determined to be greater than the demanded amount (Step S15), the host main logic 11 concludes that it is possible to supply the requested electric power. Therefore, the host main logic conducts successive operations to provide the electric power to the device 301 according to the electric power requested in the device descriptor (Step S16).

If the present remaining electric power is determined to be less than the demanded amount (Step S15), the host main logic 11 concludes that it is not desirable or not possible to supply the requested electric power, and the host main logic 11 sets a rejection signal or an 'Over Flag' indicating that the maximum electric power is not enough to supply the requested electric power to notify the device 301 of over power request (Step S17). In the notifying process, the device descriptor whose specific bit is set by the host main logic 11 may be returned to the sending device 301. After notifying of the over power request as described above, the host main logic 11 monitors whether a new device descriptor requesting an electric power is received again from the rejected demanding device 301 (Step S18).

If a re-request such as a new device descriptor, which requests an electric power supply, is generated by the re-calculation of the device 301 and receipt of the new device descriptor is determined (Step S18), the host main logic 11 conducts the above-described operations (Steps S14–S18). Namely, the host main logic 11 can check the re-demanded electric power written in the received in the new (e.g., second) device descriptor, re-calculates the current remaining electric power, and compares the two electric powers, i.e., the re-demanded electric power and the re-calculated current remaining electric power (Step S14). Accordingly, if the re-calculated current remaining power is enough (Step S15), the host main logic 11 supplies the re-demanded electric power to the device 301 (Step S16). Otherwise, it delivers the information of over power request to the device 301 again (Step S17).

If it is determined that the re-request is not received because a power requesting signal is not arrived from the rejected device 301 (Step S18) until a preset time expires (Step S19), and the device 301 has been notified of the rejection, the host main logic 11 terminates the monitoring operation and cuts off the basic power supply (Step S20) being provided for the device 301 to prevent an electric power waste. From Steps S16 and S20, operations end.

According to the above-described method, if the detachable device 301 calculates a reduced or minimum operating electric power, which is usually less than the first requested electric power, and requests it again after the first electric power request is rejected, the personal computer 10 may supply the electric power requested by the detachable device 301 without any physical separation and re-connection of cable lines. Further, even though the re-calculated operating electric power is equal to the previously-requested one, the requested electric power from the detachable device 301 may be supplied during the repetitive requesting and rejecting processes whenever the remaining electric power is increased because of the electric power supply change to other devices or the like.

Figure 5:
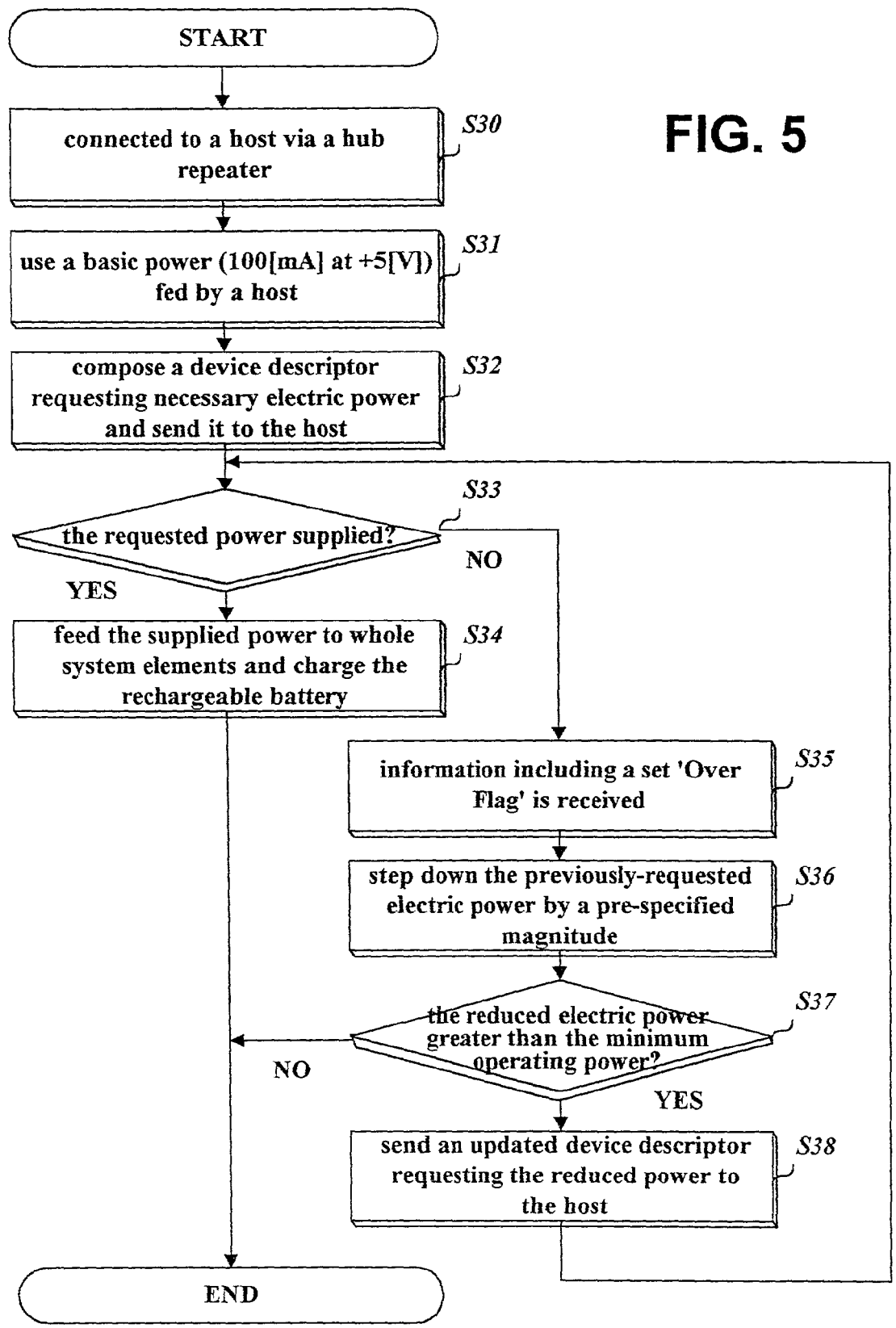
FIG. 5 is a flow chart of another embodiment of a power controlling method using a USB in accordance with the present invention.

FIG. 5 is a flow chart illustrating another preferred embodiment of a power controlling method conducted through an USB in accordance with the present invention. The preferred embodiment of FIG. 5 shows a self-adjusting procedure conducted by the detachable device 301, which is a power demanding device.

After starting, as shown in FIG. 5, the power controlling logic 35 or the like of the detachable device 301 is coupled to a host such as the personal computer 10 via the hub repeater 20 (Step S30). The detachable device 301 is preferably supplied with a basic power supply, namely, 100 mA at +5V, which is defined by the USB standard, via the hub repeater 20 under the control operation of the host main logic 11 of the personal computer 10. The supplied basic power is used in maintaining electric energy for those basic elements of the detachable device 301 (Step S31).

Further, the power controlling logic 35 composes a device descriptor, which is required for a self-adjusting process with the host main logic 11, writes a request for electric power in the device descriptor, and sends the device descriptor to the personal computer 10 (Step S32). Usually, the first demanded electric power is for a full performance of the device 301. After sending the device descriptor, the power controlling logic 35 monitors whether the requested electric power, for example, 500 mA at +5V is supplied via the hub repeater 20 (Step S33). If the demanded electric power is fed, the power is applied to the system elements of the detachable device 301 and charges the rechargeable battery 37 at the same time (Step S34).

If a non-standard connecting bus other than USB is used, the power voltage may be different from +5V, namely, it may be one of +9V, +12V, and so on. In this case, the range of the requested electric power to the personal computer 10 may be increased. In this preferred embodiment shown in FIG. 5, it is assumed that the power voltage is +5V. However, the present invention is not intended to be so limited.

If a rejection signal indicating that the demanded electric power can not be supplied, e.g., the device descriptor in which the 'Over Flag' is set, is received (Step S35), instead of supplying the requested electric power, the power controlling logic 35 steps down the first demanded electric power (Step S36) by a pre-specified magnitude, for example, 100 mA at +5V, thus, the adjusted electric power demand becomes 400 mA compared to the first demanded power of 500 mA.

Subsequently, the power controlling logic 35 determines whether the reduced electric power demand is still greater than a prescribed or minimum operating power of the detachable device 301 (Step S37). If determined to be greater, the power controlling logic 35 updates the device descriptor by writing the reduced or adjusted electric power demand in it and sends it to the host main logic 11 (Step S38). If determined to be less, the power controlling logic 35 (Step S37), operations preferably end.

When the host main logic 11 receives the device descriptor demanding the reduced electric power, it supplies the demanded electric power or sends the detachable device 301 the signal indicating that the demanded electric power can not be supplied. Operations of the host main logic 11 can then repeatedly be performed according to the preferred embodiment described above and as shown in FIG. 4.

The power controlling logic 35 of the detachable device 301 coupled to the USB 30 preferably conducts power supply monitoring operations (Steps S33,S35–S38) repeatedly to check whether the demanded electric power is fed from the personal computer 10. If the demanded electric power greater than the prescribed or the minimum operating power is fed from the personal computer 10, it can be used in charging the rechargeable battery 37 and in running all or a part of the system components.

Figure 6:
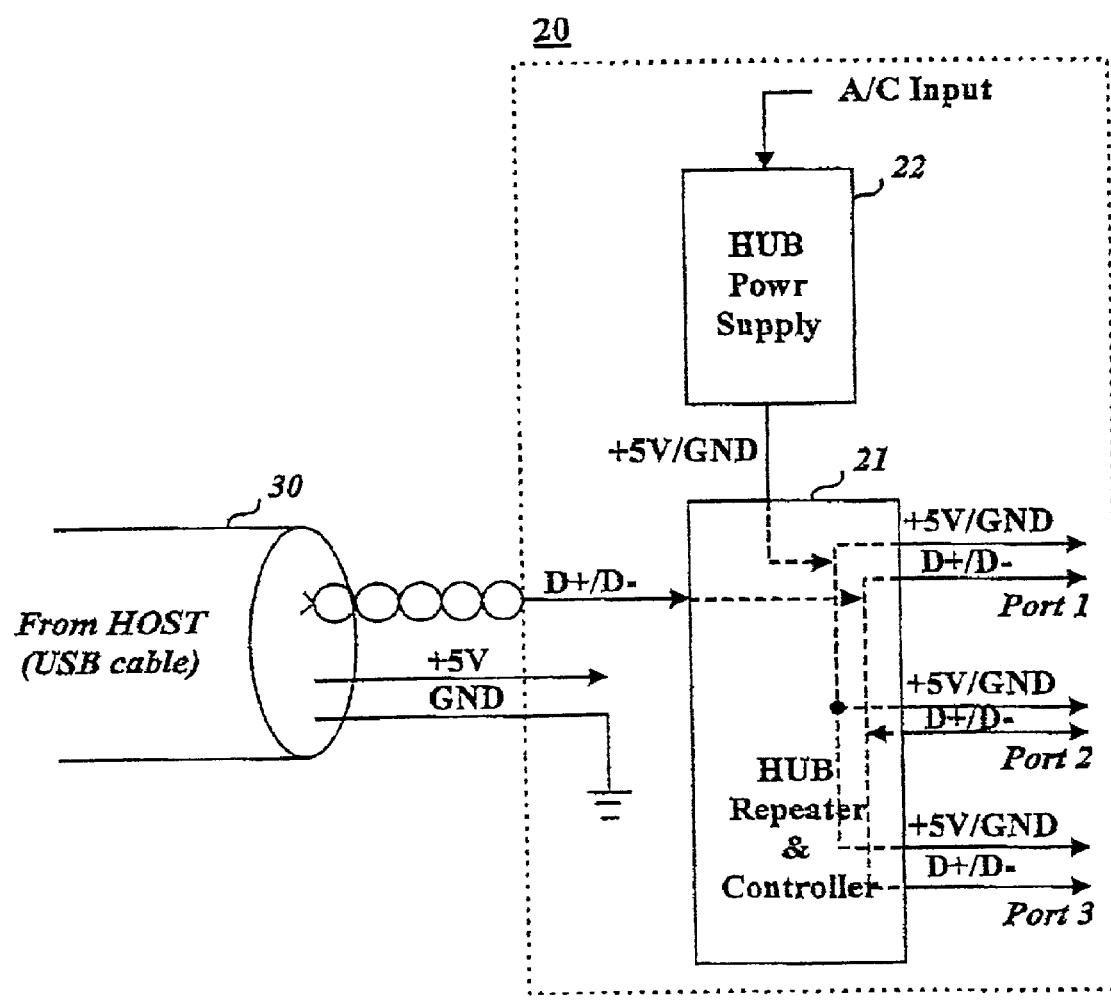
FIG. 6 is a block diagram of a hub repeater in which a power controlling method using a USB in accordance with the present invention is embedded.

If the hub repeater 20 is equipped with an internal power supplying unit 22 as shown in FIG. 6 that can accept an AC power directly, transform the AC power into +5V DC power, and supply the DC power for other or additionally coupled devices as well as all internal components of the hub repeater 20, preferred embodiments of an electric power self-adjusting process described using the detachable device 301 can be conducted by a hub repeating/controlling unit 21 instead of the personal computer 10. In this case, the hub repeater 20 supplies the detachable device 301 with an electric power determined through the electric power self-adjusting process between the hub repeating/controlling unit 21 and the power controlling logic 35 of the detachable device 301.

In the USB standard, eight bits are usually allocated for representation of electric power in a device descriptor. Therefore, if a change step is 2 mA at 5V, the maximum electric power can be demanded with eight bits is 512 mA. If the maximum electric power is intended to be increased on the condition of 2 mA change step, more bits, e.g., 16 bits must be allocated for representation of electric power. If the bit length for the electric power representation is not extended, the change step greater than 2 mA may be used. For example, if the change step is re-defined to 4 mA, the maximum electric power is extended to 1024 mA.

In a non-standard connecting bus other than the USB standard using +5V power, a variety of bit lengths besides 8 bits may be used for representing a demanded electric power in a device descriptor.

As described above, preferred embodiments of a power controlling method and apparatus have various advantages. Power controlling methods conducted through an USB in accordance with the preferred embodiments can remove the inconvenient work of disconnecting and re-connecting a cable physically for a USB device to make a power demand again.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of demanding and supplying electric power through a serial bus, comprising:
    checking a first electric power demand from a device when the device is connected through the serial bus;
    sending the device a power supply rejection signal if the first electric power is not supplied;
    calculating, by the connected device, a second reduced or minimum operating power for operating the connected device when the receiving the power supply rejection signal;
    requesting, by the connected device, the second electric power be supplied to the connected device;
    determining whether the second electric power can be supplied if received from the connected device; and
    supplying the second electric power to the connected device based on the determining result.

2. The method of claim 1, further comprising checking a device descriptor received from the connected device to judge a magnitude of the first or second electric power after supplying a prescribed basic electric power to the device.

3. The method of claim 2, further comprising cutting off the basic electric power supply to the device if the connected second electric power is not received until a prescribed time expires after sending the power supply rejection signal.

4. The method of claim 1, further comprising sending a set flag indicative of power supply rejection signal if the first or second electric power is greater than a current remaining electric power.

5. The method of claim 4, wherein the current remaining electric power varies when electric power supplied to other devices coupled through the serial bus changes, and wherein the connected device remains continuously connected to the serial bus.

6. The method of claim 1, wherein a current remaining electric power is re-calculated whenever an additional electric power is received from the connected device, and wherein a determination of whether the additional electric power can be supplied is based on a most recent current remaining electric power calculation.

7. The method of claim 1, wherein when the second electric power is greater than a remaining electric power, the power supply rejection signal is sent to the connected device, and wherein the second electric power is supplied to the connected device when the second electric power is less than the remaining electric power.

8. A computer program embodied on a computer readable medium for a supplying device to monitor and control electric power supply, comprising the instructions of:
    checking how much electric power is demanded from a connected device when the connected device is connected through a serial bus;
    sending the connected device a first signal of rejected power supply if the demanded electric power is not supplied;
    calculating, by the connected device, a reduced or minimum operating power for operating the connected device when receiving the power supply rejection signal;
    requesting the reduced or minimum electric power be supplied to the connected device;
    determining whether the reduced or minimum electric power can be supplied; and
    supplying the reduced or minimum electric power for the connected device based on the determining result.

9. The program of claim 8, further comprising an instruction of checking a device descriptor received from the connected device to know magnitudes of the demanded electric powers after supplying a pre-determined basic electric power to the connected device.

10. The program of claim 9, further comprising an instruction of cutting off the basic electric power supply to the connected device if the reduced or minimum demanded electric power is not received until a predetermined time expires after sending the first signal.

11. The program of claim 8, wherein a current remaining electric power is re-calculated whenever a demand for electric power is received from the connected device after the first signal of rejected power supply, and wherein whether the demanded electric power can be supplied is determined based on a most recent current remaining electric power calculation.

* * * * *